United States Patent
Chang et al.

(10) Patent No.: US 10,652,583 B2
(45) Date of Patent: May 12, 2020

(54) COMPRESSION OF IMAGE ASSETS

(71) Applicant: Apple Inc., Cupertino, CA (US)

(72) Inventors: Paul Chang, San Jose, CA (US); Ali Sazegari, Cupertino, CA (US); Eric Bainville, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/242,276

(22) Filed: Aug. 19, 2016

(65) Prior Publication Data
US 2018/0054630 A1 Feb. 22, 2018

(51) Int. Cl.
| | | |
|---|---|---|
| *H04N 19/70* | (2014.01) | |
| *H04N 19/91* | (2014.01) | |
| *H04N 19/12* | (2014.01) | |
| *H04N 19/17* | (2014.01) | |
| *H04N 19/85* | (2014.01) | |
| *G06T 9/00* | (2006.01) | |
| *H04N 19/186* | (2014.01) | |
| *H04N 19/136* | (2014.01) | |
| *H04N 19/21* | (2014.01) | |
| *H04N 19/27* | (2014.01) | |

(52) U.S. Cl.
CPC ............ *H04N 19/91* (2014.11); *G06T 9/005* (2013.01); *H04N 19/12* (2014.11); *H04N 19/136* (2014.11); *H04N 19/17* (2014.11); *H04N 19/186* (2014.11); *H04N 19/21* (2014.11); *H04N 19/27* (2014.11); *H04N 19/85* (2014.11)

(58) Field of Classification Search
CPC .... H04N 19/14; H04N 19/172; H04N 19/176; H04N 19/61; H04N 19/124; H04N 19/15; H04N 19/174; H04N 19/30; H04N 19/91
USPC .......................................... 382/232–233, 244
See application file for complete search history.

(56) References Cited

U.S. PATENT DOCUMENTS

| | | | | |
|---|---|---|---|---|
| 6,567,559 B1 * | 5/2003 | Easwar | ..................... | G06T 9/00 358/1.15 |
| 6,633,674 B1 * | 10/2003 | Barnes | .................. | G06T 3/4084 375/E7.013 |
| 7,190,284 B1 * | 3/2007 | Dye | ....................... | G06F 12/023 341/51 |
| 8,363,969 B1 * | 1/2013 | Wang | ..................... | H04N 19/30 382/251 |

(Continued)

OTHER PUBLICATIONS

M. Coatsworth, J. Tran and A. Ferworn, "A hybrid lossless and lossy compression scheme for streaming RGB-D data in real time," 2014 IEEE International Symposium on Safety, Security, and Rescue Robotics (2014), Hokkaido, 2014, pp. 1-6. (Year: 2014).*

(Continued)

*Primary Examiner* — Iman K Kholdebarin
(74) *Attorney, Agent, or Firm* — Fish & Richardson P.C.

(57) ABSTRACT

A hybrid compression method for compressing images is provided. The method identifies a first set of image components to be compressed by a lossy compression format and a second set of image components to be compressed by a lossless compression format. The method then encodes the first set of image components according to the lossy compression format and encodes the second set of image components according to the lossless compression format. The method then generates a compressed structure that includes the lossy-compressed first set of image components and the lossless-compressed second set of image components.

24 Claims, 10 Drawing Sheets

(56) References Cited

U.S. PATENT DOCUMENTS

| | | | | |
|---|---|---|---|---|
| 8,411,942 B2* | 4/2013 | Chen | | H04N 19/12 |
| | | | | 382/166 |
| 8,565,540 B2* | 10/2013 | Solomon | | H04N 5/23229 |
| | | | | 348/222.1 |
| 8,648,858 B1* | 2/2014 | Swenson | | G06T 9/00 |
| | | | | 345/428 |
| 8,983,185 B2* | 3/2015 | Deng | | G06T 9/00 |
| | | | | 382/162 |
| 9,247,260 B1* | 1/2016 | Swenson | | H04N 19/423 |
| 9,667,969 B2* | 5/2017 | Rondao Alface | | G06T 9/001 |
| 9,723,197 B2* | 8/2017 | Li | | H04N 5/23212 |
| 9,928,418 B2* | 3/2018 | Segalovitz | | G06K 9/00463 |
| 2003/0039396 A1* | 2/2003 | Irvine | | H04N 19/119 |
| | | | | 382/233 |
| 2005/0089234 A1* | 4/2005 | Base | | H04N 19/60 |
| | | | | 382/239 |
| 2006/0256380 A1* | 11/2006 | Klassen | | H04N 19/30 |
| | | | | 358/1.16 |
| 2007/0098283 A1* | 5/2007 | Kim | | H04N 19/176 |
| | | | | 382/239 |
| 2008/0247641 A1* | 10/2008 | Rasmusson | | G06T 11/40 |
| | | | | 382/166 |
| 2009/0154818 A1* | 6/2009 | Stefanov | | G06T 9/00 |
| | | | | 382/239 |
| 2012/0027083 A1* | 2/2012 | Narroschke | | H04N 19/70 |
| | | | | 375/240.03 |
| 2012/0076197 A1* | 3/2012 | Byford | | H04N 19/00 |
| | | | | 375/240.01 |
| 2013/0136125 A1* | 5/2013 | Jain | | H04L 47/38 |
| | | | | 370/392 |
| 2013/0234949 A1* | 9/2013 | Chornenky | | G06F 3/0216 |
| | | | | 345/169 |
| 2013/0251256 A1* | 9/2013 | Deng | | G06T 9/00 |
| | | | | 382/166 |
| 2014/0112591 A1* | 4/2014 | Kalevo | | G06T 9/00 |
| | | | | 382/233 |
| 2014/0226186 A1* | 8/2014 | Shiraishi | | G06K 15/1851 |
| | | | | 358/2.1 |
| 2015/0016551 A1* | 1/2015 | Esenlik | | H04N 19/117 |
| | | | | 375/240.29 |
| 2015/0100555 A1* | 4/2015 | Tremblay | | G06T 15/10 |
| | | | | 707/693 |
| 2015/0117518 A1* | 4/2015 | Rondao Alface | | G06T 9/001 |
| | | | | 375/240.02 |
| 2015/0138229 A1* | 5/2015 | Ghosh | | G09G 5/393 |
| | | | | 345/629 |
| 2015/0138237 A1* | 5/2015 | Ghosh | | G09G 5/36 |
| | | | | 345/634 |
| 2017/0229052 A1* | 8/2017 | Veernapu | | G09G 3/2003 |

OTHER PUBLICATIONS

U.S. Appl. No. 15/083,296, Inventor Unknown, "Improved Compression System," filed Mar. 29, 2016.

* cited by examiner

COMPRESSION OF IMAGE ASSETS

BACKGROUND

In computing, data compression, source coding, or bit-rate reduction involves encoding information using fewer bits than the original representation. Compression reduces bits by identifying and eliminating statistical redundancy. The process of reducing the size of a data file is referred to as data compression. Compression is useful because it helps reduce resource usage, such as data storage space or transmission capacity.

Compression can be either lossy or lossless. Lossy compression (or irreversible compression) is the class of data encoding methods that uses inexact approximation and partial data discarding to represent the content. Lossless compression is a class of data compression algorithms that allows the original data to be perfectly reconstructed from the compressed data. By contrast, lossy compression permits reconstruction only of an approximation of the original data, though this usually improves compression rate (and therefore reduces file sizes.)

SUMMARY

Some embodiments of the invention provide a hybrid compression method for compressing images. The method identifies a first set of image components to be compressed by a lossy compression format and a second set of image components to be compressed by a lossless compression format. The method then encodes the first set of image components according to the lossy compression format and encodes the second set of image components according to the lossless compression format. The method then generates a compressed structure that includes the lossy-compressed first set of image components and the lossless-compressed second set of image components.

Some embodiments use the hybrid compression method for encoding image data for delivery across a limited-bandwidth transmission medium such as the Internet, specifically for encoding images that includes both color data and Alpha channel data, such as image assets of UI items, titles, and overlays. Rather than compressing both color data and Alpha channel data by using a lossless compression format for compressing images (e.g., PNG), some embodiments use the hybrid compression method and compress the color data using a lossy compression format (e.g., JPEG) and the Alpha channel data using a fast lossless compression format. Examples of such fast lossless compression includes standard data compression algorithm ZLib, which relies on Huffman encoding. Some embodiments use lossless compression techniques such as LZFSE that employs vectorization (parallel processing), match searching, and finite state entropy encoding.

Experiments show that the hybrid JPEG+LZFSE compression encoding provides significant improvement in performance over PNG when compressing ARGB assets files for digital media players. Some experiment results show JPEG+LZFSE hybrid compression having 4.1× improvement in compression ratio over PNG compression.

In some embodiments, PNG coded data include layers of image data, and one of these image layers can be for glow/aura effect based on Gaussian blur. In some embodiments, in addition to the Alpha channel, glow/aura effect layer is also encoded by using lossless compression such as LZFSE. In some embodiments, glow/aura effect layer is compressed by using down-sampling, and is uncompressed or restored by up-sampling.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. More over, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
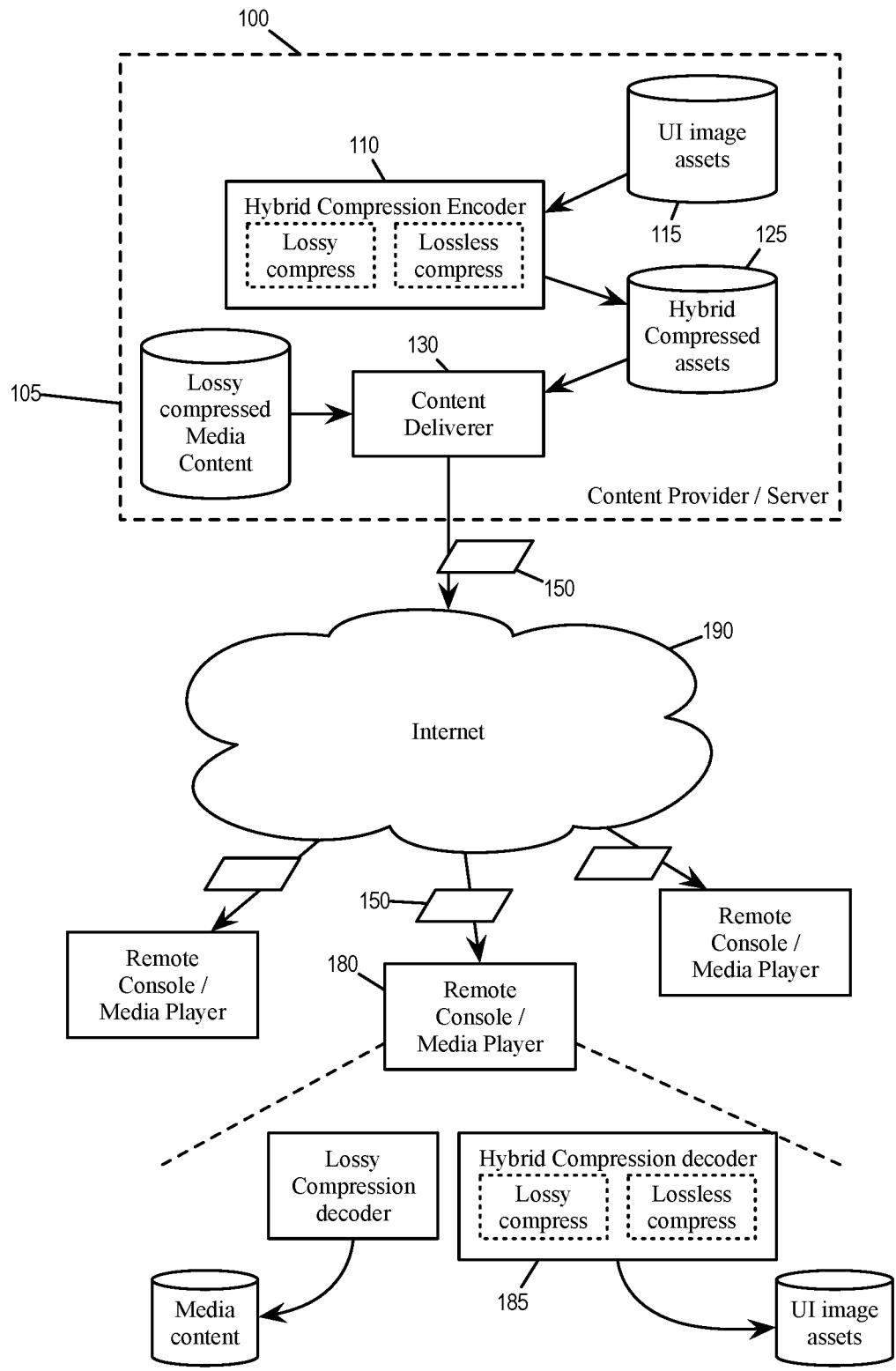
FIG. 1 illustrates a content provider that uses hybrid compression to compress image assets for delivery across the Internet.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Lossy compression algorithm/format such as JPEG (Joint Photographic Expert Group) or MPEG (Moving Picture Expert Group) is known to achieve great compression ratio for images at the cost of losing some of the image data. This is deemed acceptable for most image data since the lost data is generally imperceptible by human eyes. However, lossy compression produces unacceptable results when applied to other types of data in which data loss due to compression can be disturbingly noticeable or outright catastrophic. On the other hand, when applying lossless compression such as ZLib to image data, the result is usually disappointing as lossless compression is unable to exploit the limit of human visual perception to achieve greater compression ratio.

Modern digital media players such as AppleTV® are often network appliances that receive graphical or image content over the Internet for display at a local console. Since Internet bandwidth available to an average household is always quite limited, the image content delivered to digital media players is necessarily compressed in order to deliver the most amount of content over that limited bandwidth. Some of the image content received by a digital media player over the Internet is subscribed media content. The subscribed media content is typically compressed by lossy compression formats such as JPEG and/or MPEG as it is almost entirely image data that can be lossy-compressed without affecting viewer experience. On the other hand, some of the image data received is more sensitive to compression data loss. This image data includes image assets for presenting graphical user interface (UI) items such as icons, menu items, etc., which also includes Alpha Channel data that cannot be lossy-compressed without noticeable artifacts. Consequently, some content providers encode these types of image content by using lossless compression formats such as PNG (Portable Network Graphics), which are tailored to image content by performing several filtering operations on image data.

Generally speaking, for image data, PNG is unable to achieve the compression ratio of lossy compression and is very slow when compared to JPEG. For non-image data, PNG is unnecessarily cumbersome when compared to a fast compression algorithm such as ZLib, which does not perform image-processing operations. PNG is nevertheless the prevalent choice of compression format for compressing the various image components of graphical UI items, which includes both color data (in RGB, YUV, or other formats) as well as Alpha channel (for performing Alpha compositing to create the appearance of transparency).

Some embodiments of the invention provide a hybrid compression method for compressing images. The method identifies a first set of image components to be compressed by a lossy compression format and a second set of image components to be compressed by a lossless compression format. The method then encodes the first set of image components according to the lossy compression format and encodes the second set of image components according to the lossless compression format. The method then generates a compressed structure that includes the lossy-compressed first set of image components and the lossless-compressed second set of image components.

Some embodiments use the hybrid compression method for encoding image data for delivery across a limited-bandwidth transmission medium such as the Internet, specifically for encoding images that includes both color data and Alpha channel data, such as image assets of UI items, titles, and overlays. Rather than compressing both color data and Alpha channel data by using an image-processing lossless compression format (e.g., PNG), some embodiments use the hybrid compression method and compress the color data using a lossy compression format (e.g., JPEG) and the Alpha channel data using a fast lossless compression format (e.g., ZLib or another lossless compression format).

I. Lossless-Lossy Hybrid Compression

FIG. 1 illustrates a content provider 100 that uses hybrid compression to compress image assets for delivery across the Internet. The content provider 100 is a server that provides media content 105 (movies, TV show, etc.) as well as image assets 115 for UI items to remote consoles 180 for display. The image assets 115 are compressed under the lossy-lossless hybrid compression for delivery across the Internet 190.

As illustrated, the content server 100 includes a media content storage 105, a UI image assets storage 115, a hybrid compression encoder 110, a hybrid compressed image assets storage 125, and a content deliverer 130. The media content 105 stores lossy-compressed image data that is ready for delivery. The UI image assets 115 store data for presenting UI items that can be uncompressed or compressed under an image-processing lossless compression format (e.g., PNG). The hybrid compression encoder 110 compresses UI image assets 115 into the hybrid compressed assets 125 by employing both lossy compression and lossless compression. The content deliverer 130 in turn delivers the hybrid-compressed assets 125 across the Internet 190 to the remote consoles 180, along with lossy-compressed media content 105 (illustrated as data packets 150).

Each remote console 180 receives the compressed media content and UI image assets from server 100 across the Internet 190 (as packets 150). A remote console can be a digital media player, a tablet computer, a smart phone, a laptop or desktop computer, or any computing device capable of receiving and displaying media content from the Internet. Each remote console decompresses the received media content and UI image assets for display. As illustrated, each remote console 180 includes a lossy compression decoder (e.g., MPEG) for decoding the compressed media content for playback. Each remote console 180 also includes a hybrid compression decoder 185, which includes both a lossy compression decoder and a lossless compression decoder for decompressing the hybrid compressed image assets into UI image assets.

Figure 2:
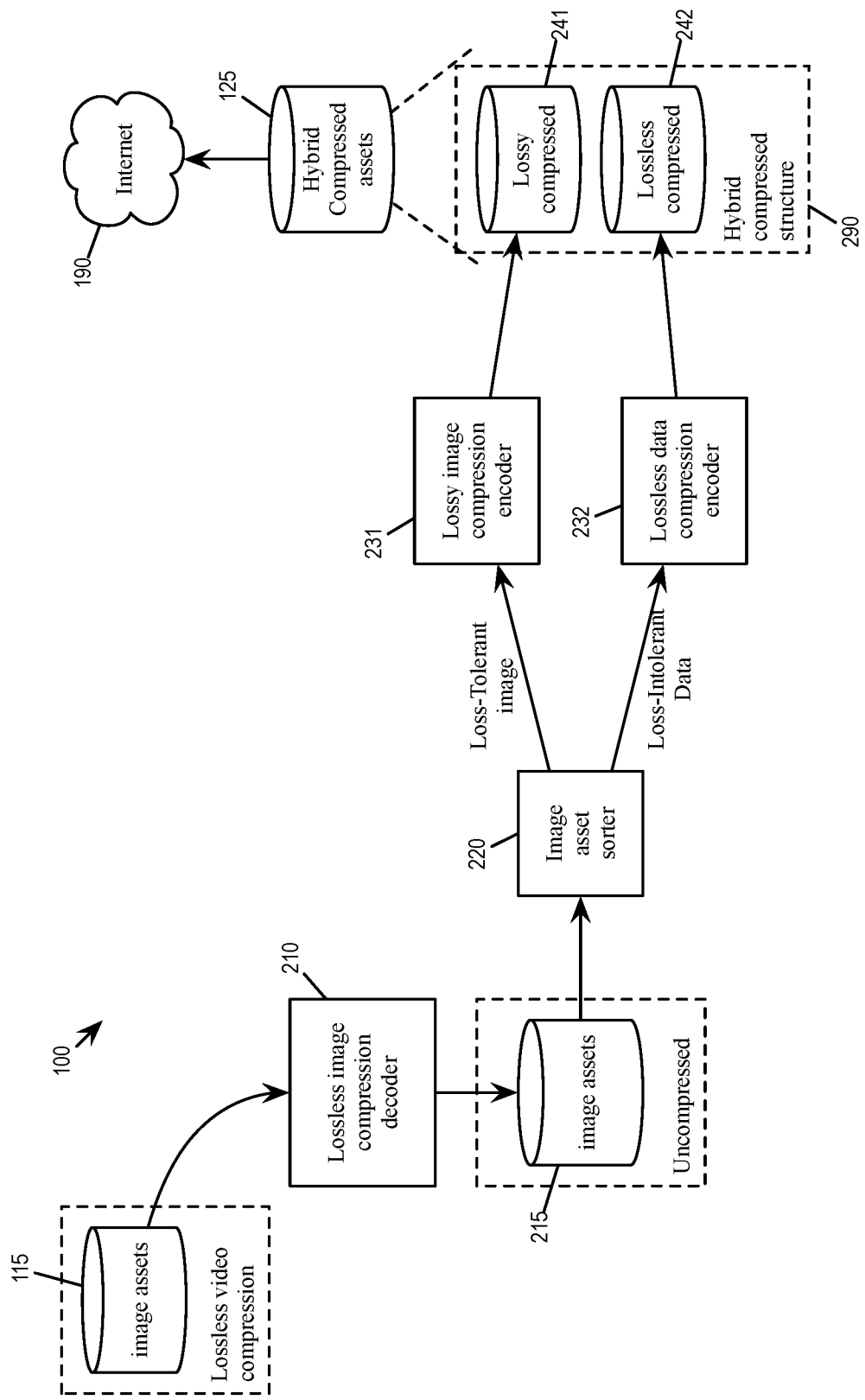
FIG. 2 illustrates the content server encoding of image assets using hybrid compression.

FIG. 2 illustrates the content server 100 in greater detail to show the encoding of image assets using hybrid compression. Specifically, the content server converts image assets that were originally encoded by lossless video compression format into image assets that are encoded under lossy-lossless compression format.

As illustrated, the content server 100 includes the image assets storage 115, a lossless image compression decoder 210, an uncompressed image assets storage 215, an image assets sorter 220, a lossy image compression encoder 231, a lossless data compression encoder 232, and the hybrid compressed assets storage 125.

In some embodiments, the image assets storage 115 stores image assets for presenting graphical items for display that are not part of the actual media content. These image assets can include image components such as color data (RGB, YUV, etc.) and Alpha Channel data for presenting UI items and/or menu items. The image assets can also include data or image components for presenting other types of graphical control items. Though referred to as "image assets", the image assets in some embodiments can include non-graphical data such as control directives to the remote consoles. In some embodiments, the image assets 115 are encoded by using a lossless image compression format such as PNG, which applies one or more image-filtering operations to the image before applying a standard lossless compression algorithm (e.g., ZLib) to the filtered image.

The lossless image compression decoder 210 is a decoder for undoing the compression encoding (e.g., PNG) of the image assets stored in the image assets storage 115 and for restoring the image assets to their original, uncompressed form. The lossless image decoder 210 stores the uncompressed image assets (color data, Alpha channel data, etc.) in the uncompressed image assets storage 215. The uncompressed image assets can be in one of several formats, such as ARGB, RGBA, (A being Alpha channel, R being Red channel, G being Green channel, B being Blue channel), AYUV, YUVA, (A being Alpha channel, Y being luminance, U and V being chrominance), etc. In some embodiments, the uncompressed image assets can include several layers of images, including a layer for aura/glow effect.

The image assets sorter 220 sorts image data in the uncompressed image assets storage 215 into (i) image components that are tolerant of lossy compression (e.g., JPEG) and (ii) image components that are not tolerant of lossy compression. In some embodiments, the RGB (or YUV) color data is considered as data that is tolerant of lossy compression, while Alpha channel data is considered as data that is intolerant of lossy compression. In some embodiments, the image assets sorter 220 sorts the image assets into loss-tolerant components and loss-intolerant components based on the format of the uncompressed image assets 215 in order to locate the different types of components. For example, some embodiments locate Alpha channel data in the uncompressed image assets based on positions assigned to Alpha channel according to the ARGB format.

The lossy image compression encoder 231 receives the image components that are identified as loss-tolerant from the image assets sorter 220 and perform lossy image compression (e.g., JPEG compression). The result is stored as lossy-compressed assets 241. Likewise, the lossless data compression encoder 232 compresses the image components that are identified as loss-intolerant from the image assets sorter 220 and perform fast lossless data compression. The result is stored as lossless-compressed assets 242.

Different embodiments use different fast lossless compression algorithms. These lossless compression algorithms are referred to as "standard" or "fast" because they are not designed for image data and do not perform any image-processing operations. They are able to achieve high compression ratio for non-image data. Examples of such fast lossless compression algorithm includes standard data compression algorithm ZLib, which relies on Huffman encoding. Some embodiments use lossless compression techniques such as LZFSE that employs vectorization (parallel processing), match searching, and finite state entropy encoding. LZFSE compression is described in U.S. patent application Ser. No. 15/083,296, titled "Improved Compression System", filed on Mar. 29, 2016. U.S. patent application Ser. No. 15/083,296 is herein incorporated by reference.

The lossy-compressed assets 241 and lossless-compressed assets 242 are placed into a hybrid compressed data structure or file 290, which is stored in the hybrid compressed assets storage 125 awaiting transmission over the Internet. In some embodiments, the hybrid compressed data structure 290 identifies the size of each compressed assets and/or the location (e.g., as an offset) of each compressed asset.

Figure 3:
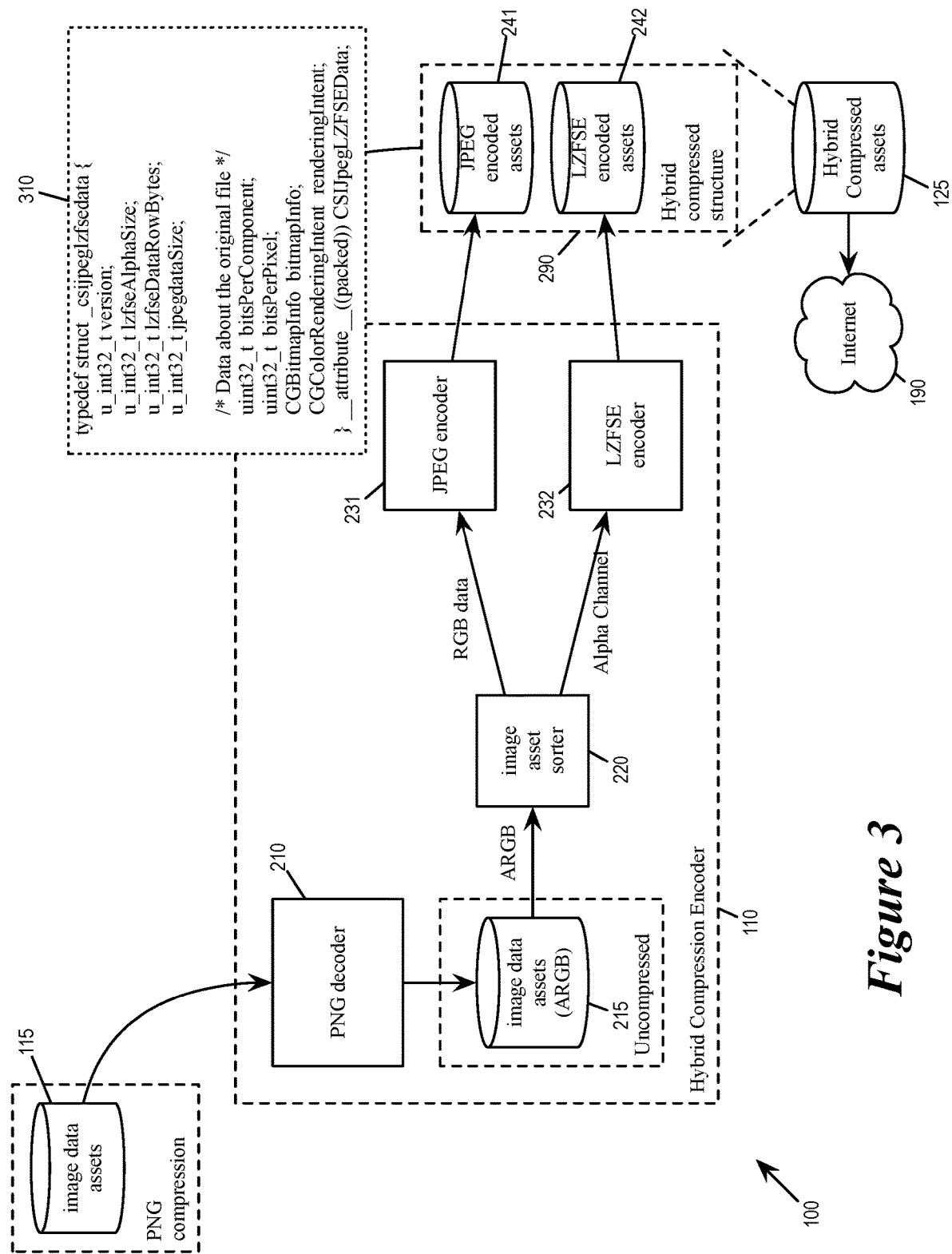
FIG. 3 illustrates the content server when converting PNG encoded image assets into hybrid JPEG/LZFSE compressed image assets for some embodiments of the invention.

FIG. 3 illustrates the content server 100 when converting PNG encoded image assets into hybrid JPEG/LZFSE compressed image assets for some embodiments of the invention. As illustrated, the image assets storage 115 stores PNG encoded image assets. The lossless image compression decoder 210 is a PNG decoder that decodes the PNG encoded image assets into uncompressed image assets 215 in ARGB format. The image assets sorter 220 sorts the ARGB data in the uncompressed image assets 215 into image components RGB data and Alpha channel data. The lossy image compression encoder 231 performing JPEG encoding compresses the RGB data into JPEG encoded assets 241. The lossless data compression encoder 232 performing LZFSE encoding compresses the Alpha channel data into LZFSE encoded assets 242. The hybrid compressed assets storage 125 stores both the JPEG encoded assets 241 and the LZFSE encoded assets 242. The JPEG encoded assets 241 and the LZFSE encoded assets 242 are organized into the hybrid-compressed data structure or file 290.

The figure illustrates an example data structure 310 for packaging the JPEG encoded lossy-compressed image components and the LZFSE encoded lossless-compressed image components as one hybrid compressed structure 290. As illustrated, the data structure 310 indicates the size of the JPEG-compressed RGB data (jpegdataSize) and the LZFSE-compressed Alpha channel data (lzfseAlphaSize). The structure 310 also includes parameters about the original image assets, such as number bits per color component (bitsPerComponent) and number of bits per pixel (bitsPerPixel), etc. This information allows the remote console to locate JPEG compressed assets and the LZFSE compressed assets within the package.

In some embodiments, the lossless image compression decoder (i.e., the PNG decoder), the image asset sorter 220, the lossy image compression encoder 231 (i.e., the JPEG encoder), and the lossless data compression encoder 232 (i.e., the LZFSE encoder) are implemented as a hybrid compression encoder 110. In some embodiments, this hybrid compression encoder is implemented as a computer program or application 110 executing on a set of processing units by using an image processing framework or an application programming interface (API). In some of these embodiments, the PNG decoder, the LZFSE encoder, and the JPEG encoder are implemented as software modules or routines in the program.

Experiments show that the hybrid JPEG+LZFSE compression encoding provides significant improvement in performance over PNG when compressing ARGB assets files for digital media players. Some experiment results show JPEG+LZFSE hybrid compression having 4.1× improvement in compression ratio over PNG compression.

Figure 4:
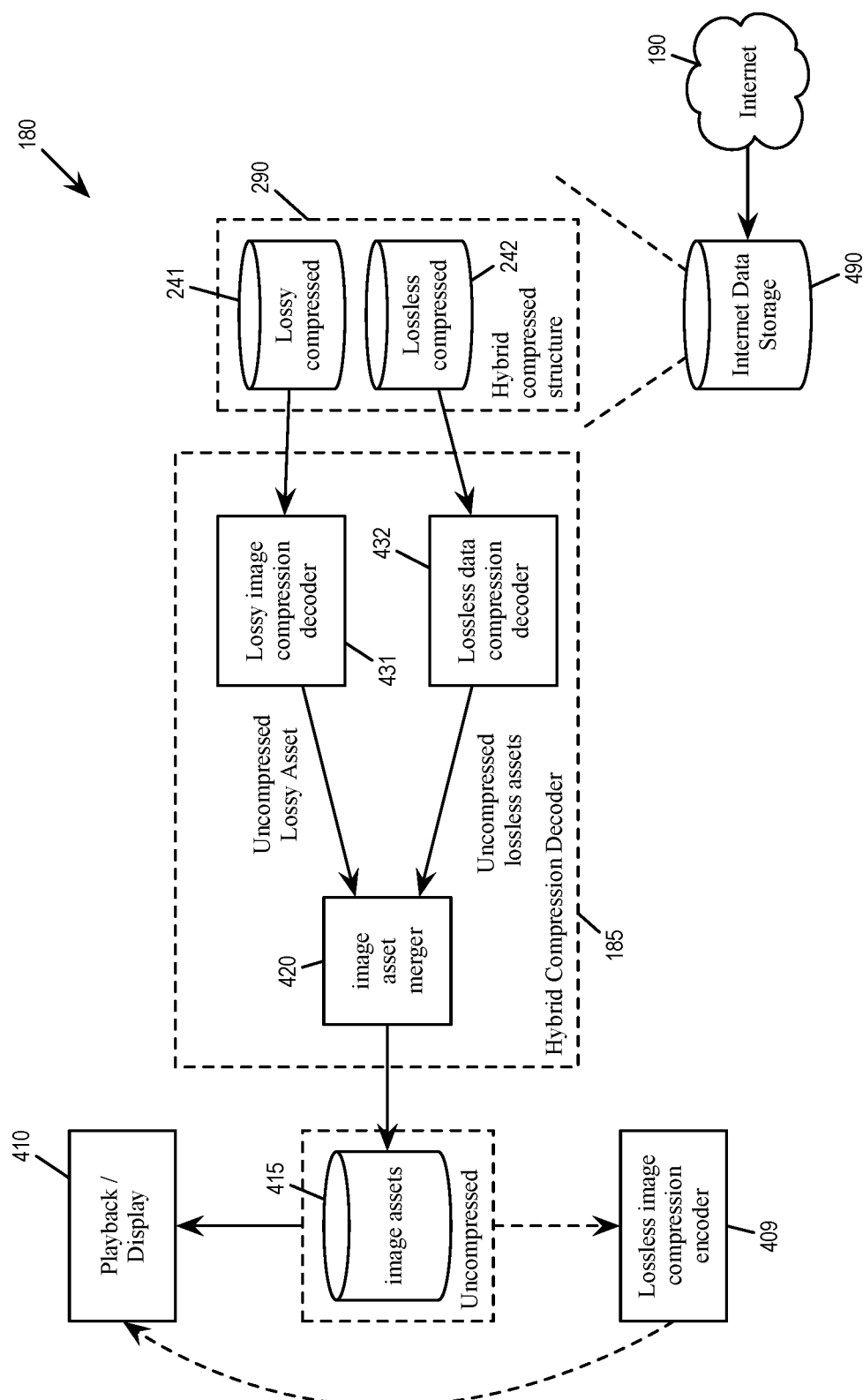
FIG. 4 illustrates a remote console decoding of hybrid-compressed image assets for display or storage.

FIG. 4 illustrates one of the remote consoles 180 in greater detail to show the decoding of hybrid-compressed image assets for display or storage. The remote console is a digital media player (e.g., AppleTV™, Roku™, etc.) that converts hybrid-compressed image assets received from the Internet into either lossless video compression format (e.g., PNG) or uncompressed image data for display. In this example the remote console 180 has received the hybrid compressed structure 290 over the Internet from the content server 100.

As illustrated, the remote console 180 includes an Internet data storage 490, a lossy image compression decoder 431, a lossless data compression decoder 432, an image assets merger 420, an uncompressed image assets storage 415, and a playback/display device 410.

The Internet data storage 490 stores data that the remote console 180 receives from the Internet 190. The Internet data storage 490 stores the hybrid-compressed data structure or file 290, which includes the lossy-compressed assets 241 and lossless-compressed assets 242.

The lossy image compression decoder 431 decompresses the lossy compressed assets 241 according to a lossy compression format (e.g., JPEG) and the lossless image compression decoder 432 decompresses the lossless compressed assets 242 according to a lossless compression format (ZLib or LZFSE). In some embodiments, the decoder 431 uses offset or size information in the hybrid compressed structure 290 to locate the lossy-compressed assets 241 and the lossless-compressed assets 242 within the structure.

The image assets merger 420 merges the image components outputted by the lossy image compression decoder 431 and image components outputted by the lossless image compression decoder 432 into contiguous uncompressed image assets. For some embodiments in which the image assets are in the format of ARGB, the image assets merger 420 receives the RGB data from the lossy image compression decoder 431 and the Alpha channel data from the lossless image compression decoder 432. The image assets merger 420 merges the RGB data and the Alpha channel data according to the format required by the image assets, e.g., in ARGB format and into layers of images. The merged image assets (with image components from both decoders 431 and 432) are stored in uncompressed image data assets 415. In some embodiments, the uncompressed assets are displayed directly by the image display/playback module 410 of the console 180, e.g., as graphical UI items for the digital media player. In some embodiments, the uncompressed assets are encoded by using a lossless image compression format (e.g., by using a PNG encoder 409) before being displayed.

In some embodiments, the image assets merger 420, the lossy image compression decoder 431 (i.e., the JPEG decoder), and the lossless data compression decoder 432 (i.e., the LZFSE decoder) are implemented as the hybrid compression decoder 185. In some embodiments, this hybrid compression decoder is implemented as a computer program or application executing on a set of processing units by using an image processing framework or an Application Programming Interface (API). In some of these embodiments, the LZFSE decoder and the JPEG decoder are implemented as software modules or routines in the program.

Figure 5:
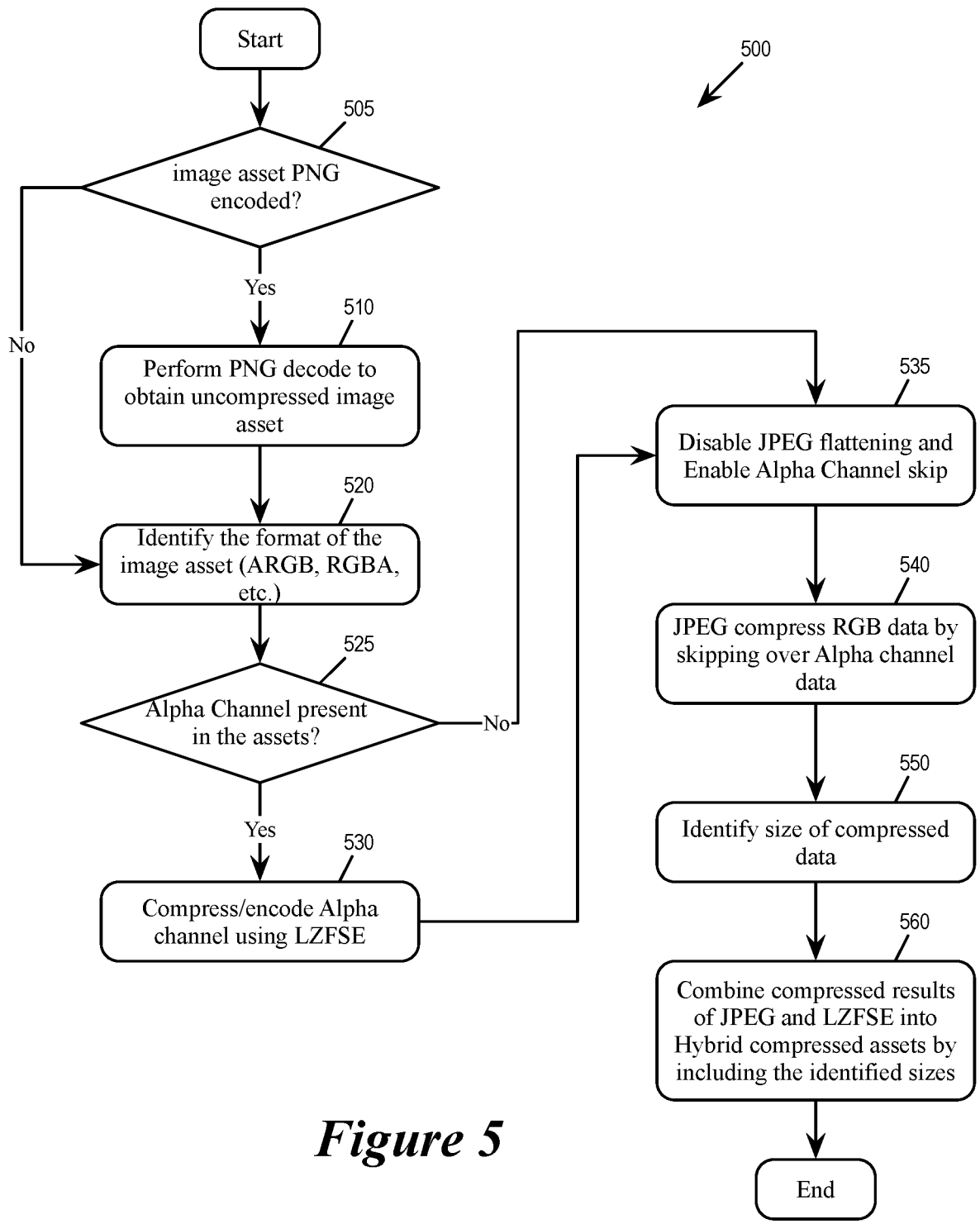
FIG. 5 conceptually illustrates a process for encoding image assets by hybrid lossy-lossless compression.

FIG. 5 conceptually illustrates a process 500 for encoding image assets by hybrid lossy-lossless compression. In some embodiments, the media content provider/server 100 performs the process 500 when compressing image assets for delivery across the Internet to remote consoles.

For some embodiments in which the image assets are PNG encoded (i.e., by a lossless image compression format), the process 500 starts by performing (at 510) PNG decoding of the image assets before proceeding to 520. On the other hand, for some embodiments in which the image assets are uncompressed, the process 500 starts at 520.

At 520, the process identifies the format of the image assets, i.e., whether it's ARGB, RGBA, or just RGB (or AYUV, PUVA, RGB, YUV, etc.) This is necessary in order to determine whether there are image components that are more suitable for lossless compression formats (e.g., ZLib, LZFSE) such as Alpha channel.

The process then determines (at 525) if there is Alpha channel (or more generally image components) that can be more efficiently compressed by lossless compression formats. For example, if the image assets are in RGB (or YUV) format then there is no Alpha channel. But if the image assets are in ARGB (or AYUV) format there is Alpha channel. If there is Alpha channel data (i.e., there are image components that are for lossless compression), the process proceeds to 530. If there is no Alpha channel data, the process proceeds to 535.

At 530, the process compresses the identified Alpha channel data (or image components that can be more efficiently compressed by lossless compression formats) by using LZFSE (or ZLib, or another fast/standard lossless compression format). The process then proceeds to 540.

At 535, the process in some embodiments makes certain preparations for lossy compression in order to ensure that the portion of the data that is to be lossless-compressed is not included in the lossy compression. For the example of ARGB, the process at 535 disables JPEG flattening and enables Alpha channel skip features in JPEG encoder. This is to ensure that RGB data will not be "flattened" to include the effect of Alpha channel, as well to ensure that only the RGB portion of the image assets will be JPEG encoded but not the Alpha channel. The process then proceeds to 540.

At 540, the process performs lossy compression (e.g., JPEG) on the RGB image components of the image assets (or the image components that are more suitable for lossy image compression).

The process then identifies (at 550) the sizes of the compressed assets, i.e., the size of the lossy-compressed image assets (e.g., 241) and the size of the lossless-compressed image assets (e.g., 242). The process then combines (at 560) the compressed results of lossy (JPEG) and lossless (ZLib or LZFSE) compressions into one hybrid-compression data structure such as 310. The identified sizes of the compressed assets are included in the data structure so the locations of the lossy-compressed assets and the lossless-compressed assets can be identified by decoders. The process 500 then ends.

Figure 6:
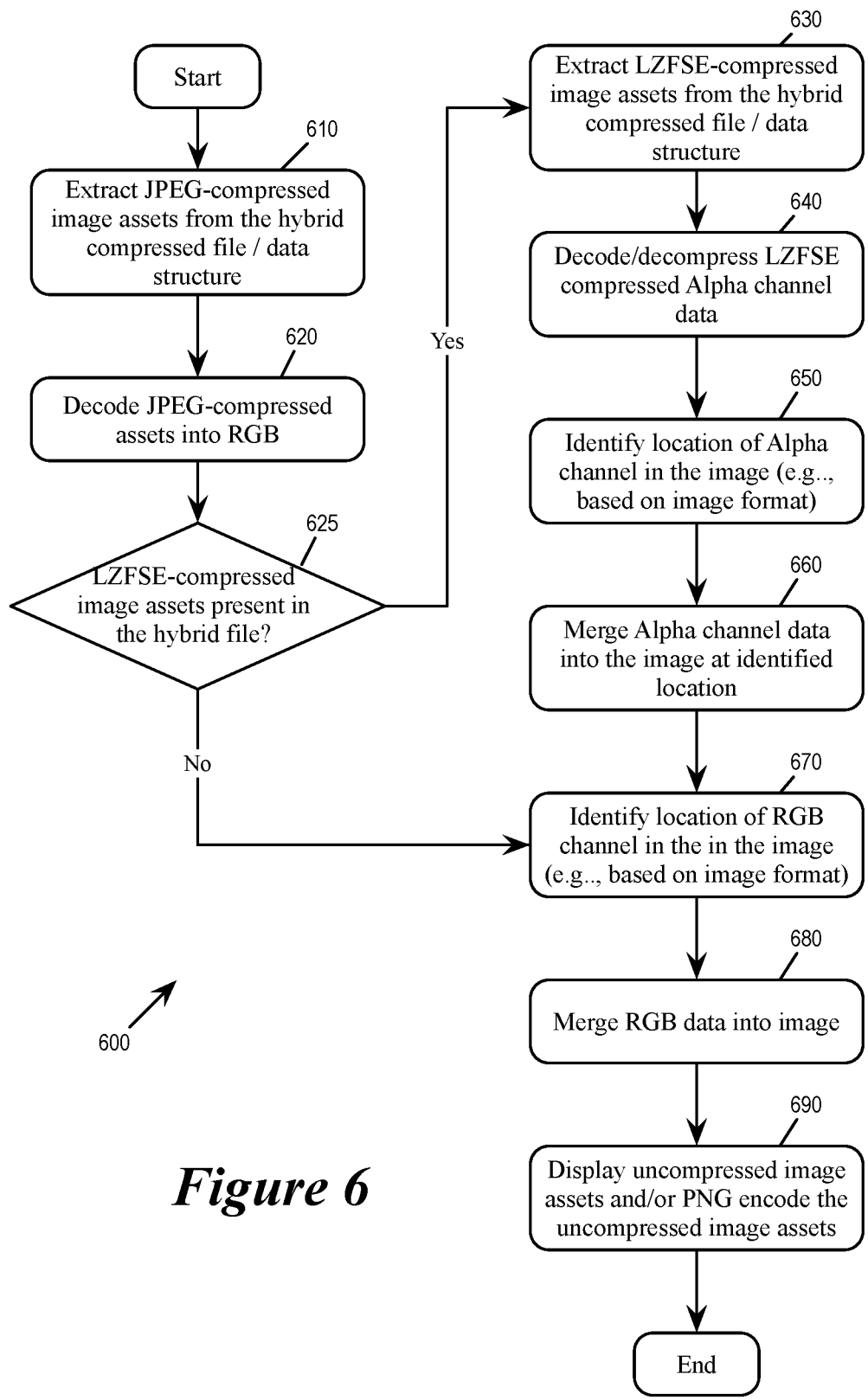
FIG. 6 conceptually illustrates a process for converting image assets encoded under hybrid lossy-lossless compression into uncompressed image assets or into PNG encoded image assets.

FIG. 6 conceptually illustrates a process 600 for converting image assets encoded under hybrid lossy-lossless compression into uncompressed image assets or into PNG encoded image assets. In some embodiments, a remote console (e.g., 180) performs the process 600 upon receiving hybrid-compressed image assets from a content provider server.

The process starts by extracting (at 610) the lossy-compressed image assets from the received hybrid-compressed image assets. In some embodiments, the hybrid-compressed assets include sizes or offsets of the lossy-compressed assets and of the lossless-compressed assets so a decoding process such as the process 600 can locate and extract the lossy-compressed image components and the lossless-compressed image components.

The process then decodes (at 620) the lossy-compressed (JPEG-compressed) image assets by using the corresponding lossy compression decoder. The decoding operation produces RGB (or YUV) color data components of the image assets.

The process then determines (at 625) whether lossless-compressed (e.g., LZFSE-compressed) image assets are present in the received hybrid-compressed data structure or file. If so, the process proceeds to 630. If lossless-compressed image assets are absent from the hybrid file, the process proceeds to 670.

At 630, the process extracts the lossless-compressed image assets from the hybrid compressed file/data structure. In some embodiments, this entails using information regarding offsets or sizes of the lossy-compressed and lossless-compressed image assets to locate the lossless-compressed image assets. The process then decodes (at 640) or decompresses the lossless-compressed (LZFSE-compressed) image assets, which produces Alpha channel data image components in some embodiments.

Next, the process identifies (at 650) the locations within the uncompressed image assets (or within the original image) into which the uncompressed data from the lossless-compressed image components (i.e., Alpha channel data)

should merge. For some embodiments in which the image assets are (or the original image is) in ARGB format, the process identifies the locations for the A (Alpha-channel) components. The process then merges (at 660) the uncompressed data from the lossless-compressed assets (i.e., Alpha channel) into the identified locations of the uncompressed image assets (or the original image). The process then proceeds to 670.

At 670, the process identifies the locations within the uncompressed image assets (or the original image) into which the uncompressed data from the lossy-compressed image components (i.e., RGB data) should merge. The process then merges (at 680) the image components from the lossy-compressed assets (RGB) into the identified locations of the uncompressed image assets (or the original image).

Once the lossy-compressed image components (RGB) and the lossless-compressed image components (Alpha) have been decompressed and merged into the final uncompressed image assets (ARGB), the process uses (at 690) the finalized uncompressed image assets to display one or more graphical UI items. In some embodiments, the display function of the digital media player uses the PNG compressed image assets as input. In some of these embodiments, the process performs PNG compression on the finalized uncompressed image assets to produce PNG compressed image assets for the display function.

Though FIG. 1-6 describe using hybrid compression to compress image assets of UI items, one of ordinary skill would understand that the hybrid compression technique described above can be used to encode any image that includes both color data and Alpha channel data for transmission. Even more generally, some embodiments use hybrid compression to compress images with different types of image components, in which lossy image compression techniques are used to compress one type of image components and lossless image compression techniques are used to compress another type of image components.

II. Compression Gaussian Blur Compression

As mentioned, in some embodiments, PNG coded data include layers of image data, and one of these image layers can be for glow/aura effect based on Gaussian blur. In some embodiments, in addition to the Alpha channel, glow/aura effect layer is also encoded by using lossless compression such as LZFSE. In some embodiments, glow/aura effect layer is compressed by down-sampling rather than by standard lossless compression or lossy image compression such as JPEG. Some embodiments down-sample the glow layer data from higher resolution coding to lower resolution coding. In some of these embodiments, the down-sampled Gaussian blur layer is transmitted over the Internet to the remote consoles, and the remote consoles "uncompress" the Gaussian blur layer by up-sampling.

Figure 7:
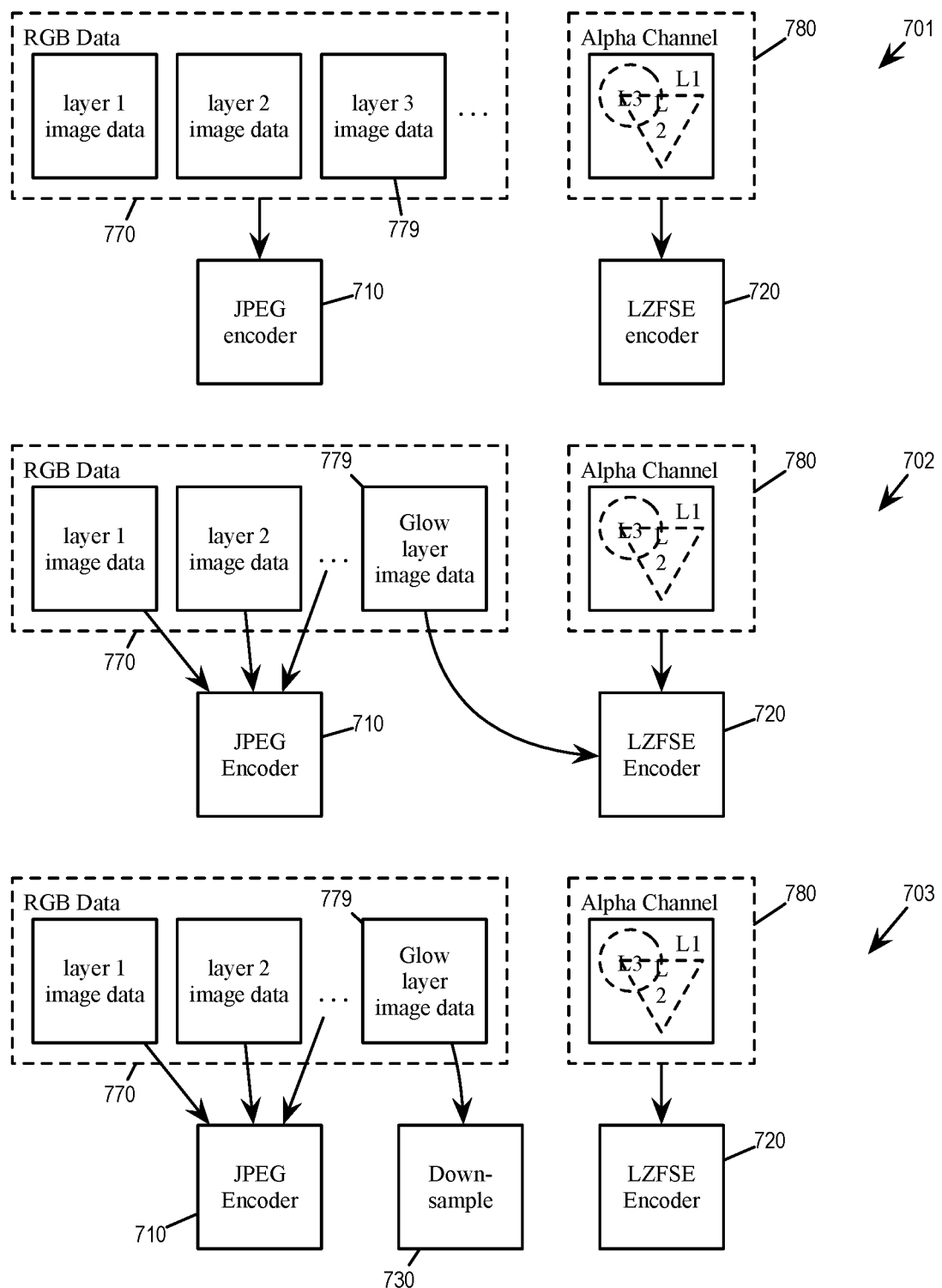
FIG. 7 illustrates different ways of hybrid-compressing ARGB data according to some embodiments of the invention.

FIG. 7 illustrates different ways of hybrid-compressing ARGB data according to some embodiments of the invention. The figure shows three different scenarios of hybrid compression 701-703 in which different compression schemes are applied to different components of an image 700 (or image assets). The image 700 includes RGB data layers 770 and Alpha channel 780.

In the first scenario 701, all RGB data layers 770 are compressed by using lossy image compression encoder 710, i.e., JPEG, while the Alpha channel 780 is compressed by using lossless data compression encoder 720, e.g., Zlib or LZFSE.

In the second scenario 702, one of RGB layers, specifically a glow/aura layer 779, is compressed by the lossless data compression encoder 720 along with Alpha channel 780, while the other RGB layers are still compressed by lossy image compression encoder 710.

In the third scenario 703, the glow layer 779 is compressed by a down-sampling operator 730.

The following is a description of compression/decompression of Gaussian blur image by down-sampling/up-sampling for some embodiments of the invention. Such a compression technique can be used as part of the hybrid-compression method described above in Section I, where the glow/aura layer of ARGB data (for UI item, titles, overlays, etc.) is compressed by down-sampling, while other RGB data is compressed by lossy image compression and the Alpha channel data is compressed by lossless data compression (i.e., scenario 703). In some embodiments, the down-sampling compression technique described can be applied to any Gaussian blur image.

For a Gaussian blur image with $\sigma=20$, some embodiments use a down-sample factor of 16×16. For a Gaussian blur image with $\sigma=40$, some embodiments use a down-sample factor of 32×32 ($\sigma$ being the blur radius).

Compression/Down-Sampling:

Given an 8-bit RGBA image with dimensions W×H, and a down-sampling scale/factor S (here 16 or 32), compression produces a W'×H' floating point RGBA image where W'=ceil(W/S) and H'=ceil(H/S) (rounded up division). For example, a W=300×H=200 image with S=16 will be represented by a 19×13 floating-point image. With 4 bits per pixel in the input image and 16 bits per pixel in the output, 300×200×4=240,000 bits is represented by using a compressed payload of 19×13×16=3,952 bits, a 60.7× compression ratio.

In addition to this small down-sampled/compressed image, some embodiments also store W, H, S, and a coefficient K. This information will be needed to decode the data (e.g., at remote consoles).

In some embodiments, the compression/down-sampling algorithm takes a block of S rows, converts them to floating point, and combines them linearly into one single row:

$$\text{output\_row}[y] = \Sigma_{k=0}^{S-1} \text{input\_row}[S*y+k]*\text{weight}[k] \qquad \text{Eq. 1.}$$

Each block of S rows of W pixels is then transformed into a single row of W pixels. For the last block, there may be less than S input rows available. Some embodiments implicitly add extra input rows filled with 0.

The weight of each input row takes only two different values:

$$\text{weight}[k] = W0 \text{ if } k<S/4 \text{ or } k>=3*S/4, \qquad \text{Eq. 2}$$

$$\text{weight}[k] = W1 \text{ if } k>=S/4 \text{ and } k<3*S/4. \qquad \text{Eq. 3}$$

In other words, the inner pixels and outer pixels of each block are weighted differently when being summed. Once the rows are reduced, the same process is applied to the W columns of each of the remaining H' rows, namely by combining pixels in S columns (already in floating point due to Eq. 1) linearly into one single column:

$$\text{output\_col}[x] = \Sigma_{k=0}^{S-1} \text{input\_col}[S*x+k]*\text{weight}[k] \qquad \text{Eq. 4.}$$

Each block of S columns of H' pixels is then transformed into a single column of H' pixels. For the last block, there may be less than S input columns available. Some embodiments implicitly add extra input columns filled with 0. This effectively down-samples each S by S block to one pixel.

Figure 8:
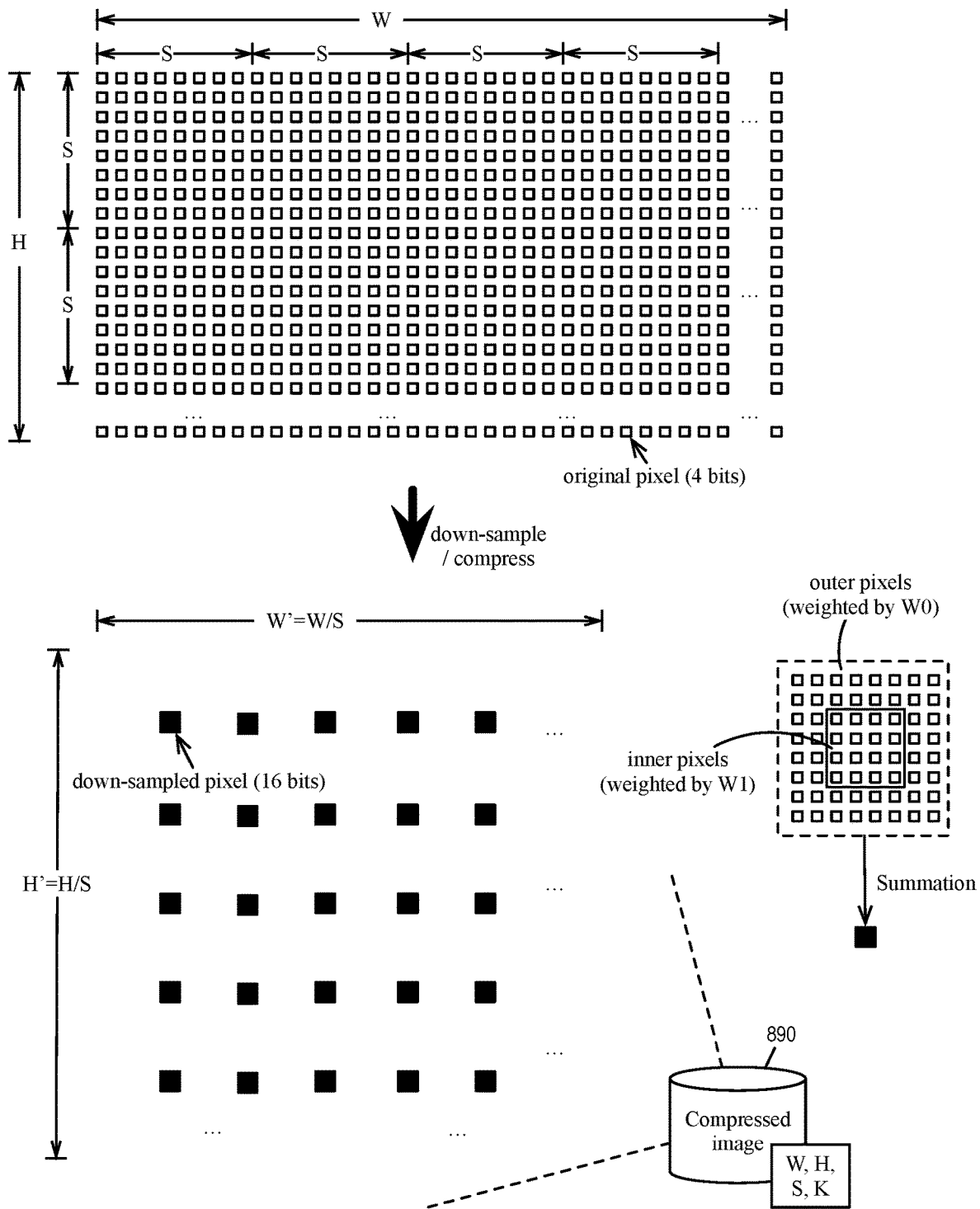
FIG. 8 illustrates compression of an image by down-sampling for some embodiments.

FIG. 8 illustrates the compression of an image (e.g., a Gaussian blur image) into a compressed image 890 by down-sampling the pixels in the image. As illustrated, the compression is accomplished by summing pixels in a S by S block into one compressed pixel, which compresses an image of W×H pixels into W'×H' image. During the summation, the outer pixels are weighted by the weighting factor W0 while the inner pixels are weighted by weighting factor W1, based on equations 1 through 4. Each compressed pixel is represented by more bits (e.g., 4×) than each pixel in the original image.

For some embodiments, Table 1 below lists the optimal values for S, W0, W1 and K. These values are determined in some embodiments by numerical optimization techniques (minimizing the error in the decoded image).

TABLE 1

Optimal Values for Compressing Gaussian Blur

|    | if σ = 20:       | if σ = 40:       |
|----|------------------|------------------|
| S  | 16               | 32               |
| K  | 0.722462512241191 | 0.725551084820608 |
| W0 | −0.332400235365730 | −0.162475065000533 |
| W1 | 0.457400235365730 | 0.224975065000533 |

It is worth noting that, in some embodiments, (W0+W1)*S=2.

Decompression/Up-Sampling:

The following is an example of up-sampling of a compressed Gaussian blur image for decompression according to some embodiments of the invention.

Given a W'×H' floating point RGBA image, decompression produces a W×H 8-bit RGBA image. As mentioned above, W, H, S, and a coefficient K are stored with the compressed payload. The coefficient K defines the polynomials used to up sample the image.

Some embodiments initially expand each row in the X direction. Each of the H' rows is expanded from W' pixels to W pixels (i.e., by expanding each pixel to S pixels in X direction) by using polynomials P, Q, and R:

$$\text{out\_pixel}[S*x+i]=P(t)*\text{input pixel}[x-1]+Q(t)*\text{input pixel}[x]+R(t)*\text{input pixel}[x+1] \text{ for } i=0 \ldots S-1 \quad \text{Eq. 5}$$

The decompression algorithm then expands each remaining column in the Y direction. Each of the W columns is expanded from H' pixels to H pixels (i.e., by expanding each pixel in the expanded rows to S pixels in Y direction) by using interpolation polynomials P, Q, and R: (the "input pixel" in Eq. 6 is the output pixel of Eq. 5)

$$\text{out\_pixel}[S*y+i]=P(t)*\text{input pixel}[y-1]+Q(t)*\text{input pixel}[y]+R(t)*\text{input pixel}[y+1] \text{ for } i=0 \ldots S-1, \quad \text{Eq. 6}$$

where t=2*(0.5+i−S/2)/S, and t is i mapped/normalized from 0 ... S−1 into [−1,+1]. Interpolation polynomials P, Q, and R are defined as followed:

$$P(t)=p0(t)*K+p1(t)$$

$$Q(t)=q0(t)*K+q1(t)$$

$$R(t)=r0(t)*K+r1(t),$$

where:

$$p0(t)=(-t*t*t+t*t+t-1)/2$$

$$q0(t)=1-t*t$$

$$r0(t)=(t*t*t+t*t-t-1)/2$$

$$p1(t)=(3*t*t*t-2*t*t-5*t+4)/8$$

$$q1(t)=t*t/2$$

$$r1(t)=(-3*t*t*t-2*t*t+5*t+4)/8$$

These six polynomials have the following properties:

$$p0(-1)=0, p0(0)=-\tfrac{1}{2}, p0(1)=0, p0'(1)=0,$$

$$r0(t)=p0(-t),$$

$$q0(t)=1-p0(t)-p0(-t),$$

$$p1(-1)=\tfrac{1}{2}, p1(0)=\tfrac{1}{2}, p1(1)=1, p1'(1)=0,$$

$$r1(t)=p1(-1),$$

$$q1(t)=1-p1(t)-p1(-t).$$

Figure 9:
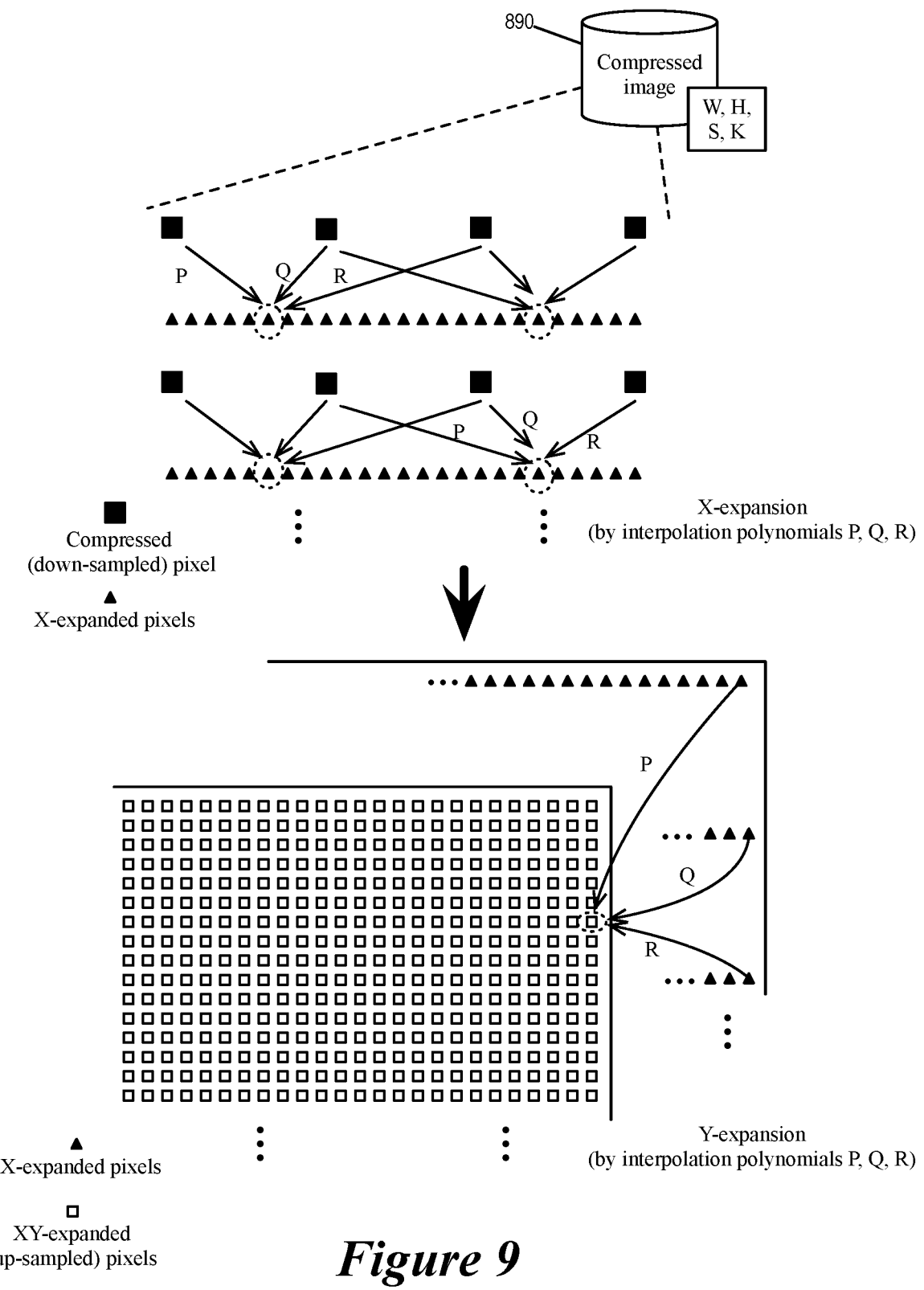
FIG. 9 illustrates decompression of an image by up-sampling for some embodiments.

Eq. 5 and Eq. 6 effectively up-samples each pixel in the compressed image into a block of S by S pixels, where each up-sampled pixel is computed by interpolating each compressed pixel with adjacent compressed pixels by using the interpolation polynomials. The coefficients of the interpolation polynomials are based on K, which is a constant that is selected based on the blur radius σ of the Gaussian blur. FIG. 9 illustrates decompression of the compressed image 890 by up-sampling through interpolation. The figure shows up-sampling/decompression by computing interpolated pixels. Each interpolated pixel is computed based on three nearest compressed pixels by using interpolation polynomials P, Q, and R. The figure shows two rounds of decompression by interpolation, one in the X-direction (x-expansion) and one in the Y-direction (y-expansion). The X-direction interpolation is based on equation 5, while the Y-direction interpolation is based on equation 6. As illustrated, the x-expansion expands compressed pixels from the compressed image into X-expanded pixels, and the y-expansion expands the X-expanded pixels into XY-expanded pixels, which are the final up-sampled/decompressed pixels.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
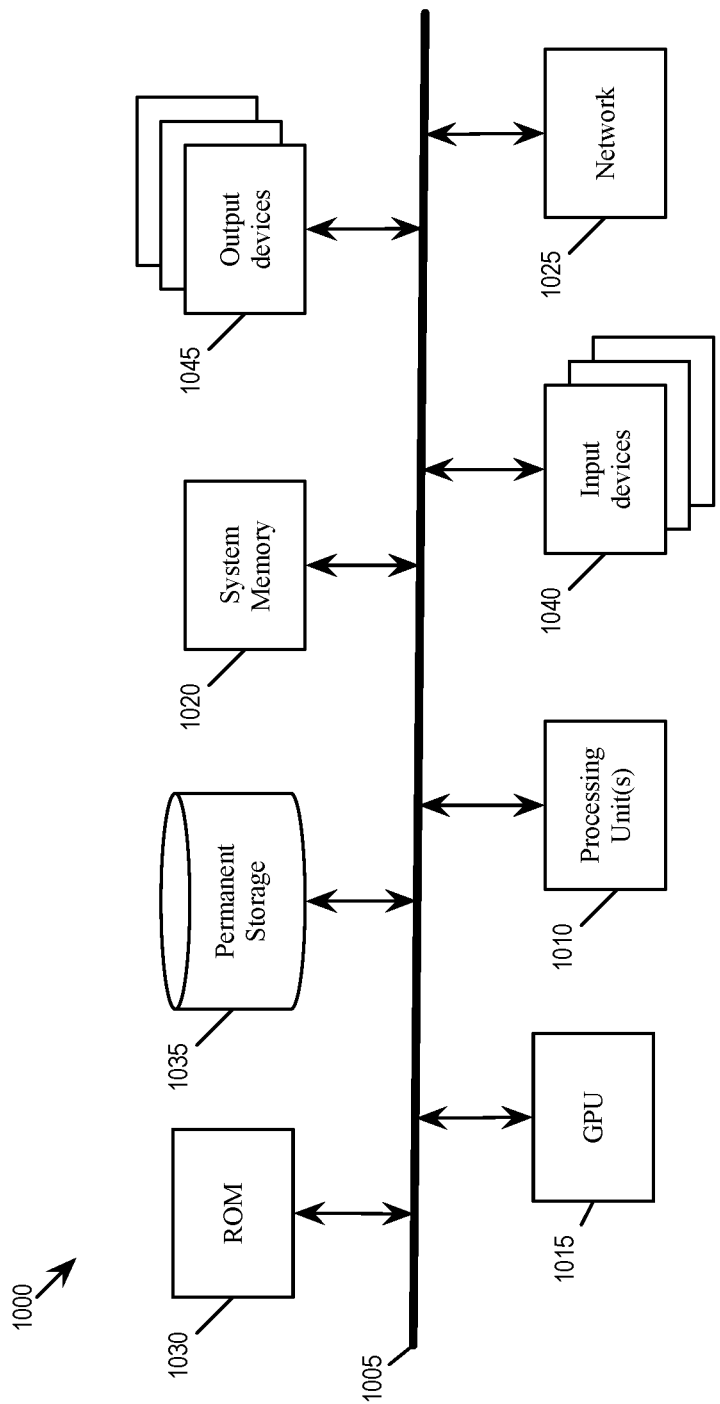
FIG. 10 conceptually illustrates an electronic system in which some embodiments of the invention are implemented.

FIG. 10 conceptually illustrates an electronic system 1000 with which some embodiments of the invention are implemented. The electronic system 1000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1000 includes a bus 1005, processing unit(s) 1010, a graphics-processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the GPU 1015, the read-only memory 1030, the system memory 1020, and the permanent storage device 1035.

From these various memory units, the processing unit(s) 1010 retrieves instructions to execute and data to process in order to execute the processes of the invention. The processing unit(s) may be a single processor or a multi-core processor in different embodiments. Some instructions are passed to and executed by the GPU 1015. The GPU 1015 can offload various computations or complement the image processing provided by the processing unit(s) 1010.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash memory device, etc., and its corresponding disk drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor needs at runtime. In some embodiments, the invention's processes are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alpha-numeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5 and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for data compression comprising:
receiving a set of user interface image assets comprising first and second sets of image data components, wherein the first set of image data components comprises color data and the second set of image data components comprises Alpha channel data;
encoding the first set of image data components by using a lossy compression format;
encoding the second set of image data components by using a lossless compression format;
generating a hybrid-compressed structure that includes the encoded first set of image data components and the encoded second set of image data components,
wherein generating the hybrid-compressed structure further comprises:
determining a location of at least one of the encoded first set of image data components or the encoded second set of image data components in the hybrid-compressed structure, and
including the location in the hybrid-compressed structure; and
transmitting the hybrid-compressed structure to a remote console for display.

2. The method of claim 1, wherein the lossless compression format is a first lossless compression format, wherein the received set of user interface image assets is encoded according to a second lossless compression format that includes image filtering operations.

3. The method of claim 2, wherein the second lossless compression format used for encoding the set of received user interface image assets is PNG (Portable Network Graphics).

4. The method of claim 1, wherein the lossy compression format used to encode the first set of image data components is JPEG (Joint Photographic Expert Group).

5. The method of claim 2, wherein the first lossless compression format used to encode the second set of image data components does not perform image-filtering operations.

6. The method of claim 5, wherein the first lossless compression format used to encode the second set of image data components uses finite state entropy encoding.

7. The method of claim 1, wherein the user interface image assets are used by the remote console for displaying a set of user interface (UI) items.

8. The method of claim 1, wherein the color data comprises image data in one of RGB (Red, Green, Blue) format and YUV (luminance and chrominance) format.

9. The method of claim 8, wherein the second set of image data components further comprises data for Gaussian blur.

10. The method of claim 1 further comprising encoding a third set of image data components in the set of user interface image assets by down-sampling, wherein the third set of image data components comprises data for Gaussian blur.

11. A method for data decompression comprising:
receiving a hybrid-compressed structure comprising a compressed set of user interface image assets, the user interface image assets comprising first and second sets of compressed image data components;
determining, using information included in the hybrid-compressed structure, locations of at least one of the first or the second sets of compressed image data components in the hybrid-compressed structure;
extracting, based on the determined locations, the first and second sets of compressed image data components from the hybrid-compressed structure;
decompressing the first set of compressed image data components, wherein the first set of image data components is encoded according to a lossy compression format;
decompressing the second set of compressed image data components, wherein the second set of image data components that is encoded according to a lossless compression format; and using the decompressed first set of image data components as color data and the decompressed second set of image data components as Alpha channel data for presenting a user interface item at a display.

12. The method of claim 11, wherein the color data comprises image data in RGB (Red, Green, Blue) format.

13. The method of claim 11, wherein the received hybrid-compressed structure comprises information for locating the first and second sets of data components in the hybrid-compressed structure.

14. The method of claim 11, wherein the lossy compression format used to encode the first set of image data components is JPEG (Joint Photographic Expert Group).

15. The method of claim 11, wherein the lossless compression format used to encode the second set of image data components does not perform image-filtering operations.

16. The method of claim 15, wherein the lossless compression format used to encode the second set of image data components uses finite state entropy encoding.

17. The method of claim 11 further comprising receiving a third set of image data components, up-sampling the third set of image data components, and using the up-sampled third set of image data components as a layer of Gaussian blur for presenting the user interface item at the display.

18. The method of claim 11, wherein the second set of image data components further comprises Gaussian blur data.

19. The method of claim 12, wherein presenting the user interface item comprises merging the color data and the Alpha channel data in ARGB (Alpha, Red, Green, Blue) format.

20. A computing device for distributing media content over the Internet to a set of remote consoles, the computing device comprising:
a set of processing units for executing instructions; and
a computer readable storage medium storing sets of instructions for execution by the set of processing units, the sets of instructions for:
receiving a set of user interface image assets comprising first and second sets of image data components, wherein the first set of image data components comprise color data and the second set of image data components comprises Alpha channel data;
encoding the first set of image data components by using a lossy compression format;
encoding the second set of image data components by using a lossless compression format;
generating a hybrid-compressed structure that includes the encoded first set of image data components and the encoded second set of image data components,
wherein generating the hybrid-compressed structure further comprises:
determining a location of at least one of the encoded first set of image data components or the encoded second set of image data components in the hybrid-compressed structure, and including the location in the hybrid-compressed structure; and transmitting the hybrid-compressed structure to a remote console for display.

21. The device of claim 20, wherein the color data is loss-tolerant data and the Alpha channel data is loss-intolerant data.

22. The device of claim 20, wherein the color data comprises image data in one of RGB (Red, Green, Blue) format and YUV (luminance and chrominance) format.

23. The method of claim 11, wherein the decompressed first set of image data components used as color data comprises image data in YUV (luminance and chrominance) format, wherein presenting the user interface item comprises merging the color data and the Alpha channel data in AYUV (Alpha, luminance, chrominance) format.

24. A method for data compression comprising:

receiving an encoded set of user interface image assets comprising first and second sets of image data components, wherein the first set of image data components comprises color data and the second set of image data components comprises Alpha channel data, wherein the encoded set of user interface image assets is encoded according to a first lossless image compression format;

decoding the encoded set of user interface image assets to obtain uncompressed first and second sets of image data components;

upon obtaining the uncompressed first and second sets of image data components:

encoding the first set of image data components by using a lossy compression format, and encoding the second set of image data components by using a second lossless compression format;

generating a hybrid-compressed structure that includes the encoded first set of image data components and the encoded second set of image data components;

determining a location of at least one of the encoded first set of image data components or the encoded second set of image data components in the hybrid-compressed structure;

including the location in the hybrid-compressed structure; and transmitting the hybrid-compressed structure to a remote console for display.

* * * * *

UNITED STATES PATENT AND TRADEMARK OFFICE
CERTIFICATE OF CORRECTION

Page 1 of 1

PATENT NO.         : 10,652,583 B2
APPLICATION NO.    : 15/242276
DATED              : May 12, 2020
INVENTOR(S)        : Paul Chang, Ali Sazegari and Eric Bainville It is certified that error appears in the above-identified patent and that said Letters Patent is hereby corrected as shown below:

In the Claims

In Column 15, Line 33, in Claim 2, delete "image filtering" and insert -- image-filtering --;

In Column 16, Line 22, in Claim 13, before "data" insert -- image --.

Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*